(12) United States Patent
Kim et al.

(10) Patent No.: US 12,537,043 B2
(45) Date of Patent: Jan. 27, 2026

(54) EMBEDDED MEMORY DEVICE, INTEGRATED CIRCUIT HAVING THE SAME AND METHOD OF OPERATING THE SAME

(71) Applicant: SAMSUNG ELECTRONICS CO., LTD., Suwon-si (KR)

(72) Inventors: Kiryong Kim, Suwon-si (KR); Jungmyung Kang, Suwon-si (KR); Inhak Lee, Suwon-si (KR); Jaesung Choi, Suwon-si (KR); Jeonseung Kang, Suwon-si (KR); Duhwi Kim, Suwon-si (KR); Jaeyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 18/507,444

(22) Filed: Nov. 13, 2023

(65) Prior Publication Data

US 2024/0412771 A1    Dec. 12, 2024

(30) Foreign Application Priority Data

Jun. 8, 2023   (KR) .................. 10-2023-0073590

(51) Int. Cl.
*G11C 5/14*         (2006.01)
*G11C 11/4072*      (2006.01)
*G11C 11/4074*      (2006.01)
*G11C 11/4096*      (2006.01)

(52) U.S. Cl.
CPC ...... *G11C 11/4074* (2013.01); *G11C 11/4072* (2013.01); *G11C 11/4096* (2013.01)

(58) Field of Classification Search
CPC ............ G11C 11/4074; G11C 11/4072; G11C 11/4096
USPC ......................................................... 365/226
See application file for complete search history.

(56) References Cited

U.S. PATENT DOCUMENTS

| | | | |
|---|---|---|---|
| 5,615,162 A * | 3/1997 | Houston | G11C 5/14 365/228 |
| 7,023,761 B1 * | 4/2006 | Tran | G11C 5/14 365/229 |
| 7,512,030 B2 * | 3/2009 | Houston | G11C 11/413 365/226 |
| 7,908,500 B2 | 3/2011 | Westwick et al. | |
| 7,956,669 B2 | 6/2011 | Chuang et al. | |
| 8,605,534 B2 * | 12/2013 | Lee | G11C 7/02 365/229 |
| 8,854,858 B2 * | 10/2014 | Bartling | G11C 11/419 365/207 |

(Continued)

*Primary Examiner* — Viet Q Nguyen
(74) *Attorney, Agent, or Firm* — Fish & Richardson P.C.

(57) ABSTRACT

An embedded memory device includes a retention voltage supply circuit outputting a retention voltage in response to a retention activation signal, and a plurality of array voltage supply circuits outputting corresponding array voltages to corresponding bit cells. The plurality of array voltage supply circuits respectively include an array switch providing the retention voltage as a corresponding array voltage in response to the retention activation signal, a power switch providing a power supply voltage as the corresponding array voltage in response to a power gate activation signal, and an auxiliary circuit compensating the corresponding array voltage during a write operation or a read operation.

19 Claims, 11 Drawing Sheets

(56) References Cited

U.S. PATENT DOCUMENTS

| | | | | |
|---|---|---|---|---|
| 9,147,498 | B2* | 9/2015 | Bonet Zordan | G11C 29/4401 |
| 9,330,751 | B2 | 5/2016 | Nagle et al. | |
| 9,529,533 | B1* | 12/2016 | Dreesen | G11C 11/419 |
| 9,620,200 | B1* | 4/2017 | Mangal | G11C 11/419 |
| 9,633,716 | B2* | 4/2017 | Kulkarni | G11C 5/147 |
| 9,830,974 | B1* | 11/2017 | Hanson | G11C 11/412 |
| 10,319,421 | B2 | 6/2019 | Su et al. | |
| 11,004,482 | B1* | 5/2021 | Lim | G11C 11/4074 |
| 11,080,371 | B2* | 8/2021 | Jin | G06F 9/45558 |
| 11,087,833 | B2* | 8/2021 | Kuo | G11C 11/4074 |
| 11,152,046 | B1* | 10/2021 | Raszka | G11C 11/413 |
| 2008/0055967 | A1 | 3/2008 | Houston et al. | |
| 2012/0182792 | A1 | 7/2012 | Cheng et al. | |
| 2013/0135955 | A1* | 5/2013 | McCombs | G11C 5/148 |
| | | | | 365/226 |
| 2013/0294149 | A1* | 11/2013 | Deng | G11C 11/413 |
| | | | | 365/156 |
| 2014/0169075 | A1* | 6/2014 | Bhatia | G11C 7/00 |
| | | | | 365/189.16 |
| 2014/0307515 | A1* | 10/2014 | Bonet Zordan | G11C 29/028 |
| | | | | 365/201 |
| 2018/0075900 | A1 | 3/2018 | Ishizu et al. | |
| 2021/0142363 | A1* | 5/2021 | Biswas | H04H 60/51 |

* cited by examiner

EMBEDDED MEMORY DEVICE, INTEGRATED CIRCUIT HAVING THE SAME AND METHOD OF OPERATING THE SAME

CROSS-REFERENCE TO RELATED APPLICATION(S)

This application claims priority under 35 U.S.C. § 119 (a) to Korean Patent Application No. 10-2023-0073590, filed on Jun. 8, 2023, in the Korean Intellectual Property Office, the entire disclosure of which is incorporated herein by reference for all purposes.

BACKGROUND

In general, a diode retention circuit is a circuit used in a static random access memory (SRAM). In general, a diode retention circuit is configured by connecting a diode between each inverter and a power terminal. This diode plays a role in maintaining data between the power supply and the inverter. A diode retention circuit is used to improve data retention in a SRAM. A diode provides reverse voltage such that data may be retained even when power is cut or a failure occurs, thereby improving the stability of SRAM cells and preventing data loss. The diode retention circuit is an important factor in ensuring data retention while significantly reducing SRAM power consumption. This circuit allows the SRAM to retain accurate data even when power is restored or a failure is cleared.

SUMMARY

In general, in some aspects, the subject matter of the present disclosure is directed to an embedded memory device in which variations in a retention circuit may be reduced, an integrated circuit having the embedded memory device, and a method of operating the embedded memory device.

One or more implementations provide an embedded memory device in which the time to enter a retention operation and the time to enter a normal operation mode may optimally vary according to a size thereof generated by a memory compiler, an integrated circuit having the embedded memory device, and a method of operating the embedded memory device.

According to some implementations, an embedded memory device includes a retention voltage supply circuit outputting a retention voltage in response to a retention activation signal; and a plurality of array voltage supply circuits outputting corresponding array voltages to corresponding bit cells. The plurality of array voltage supply circuits respectively include an array switch providing the retention voltage as a corresponding array voltage in response to the retention activation signal; a power switch providing a power supply voltage as the corresponding array voltage in response to a power gate activation signal; and an auxiliary circuit for compensating the corresponding array voltage during a write operation or a read operation.

According to some implementations, an embedded memory device includes first, second, third and fourth cell arrays; a first row decoder disposed in the first cell array and the second cell array; a second row decoder disposed in the third cell array and the fourth cell array; a first array voltage supply circuit providing a first array voltage to the first cell array; a second array voltage supply circuit providing a second array voltage to the second cell array; a third array voltage supply circuit providing a third array voltage to the third cell array; a fourth array voltage supply circuit providing a fourth array voltage to the fourth cell array; and a retention diode controller controlling the first to fourth array voltage supply circuits to share a retention voltage in a retention operation mode.

According to some implementations, an integrated circuit includes at least one processor; and a memory device storing data required for an operation of the at least one processor. The memory device includes a plurality of banks having a plurality of bit cells connected between wordlines and bitlines; array voltage supply circuits providing an array voltage corresponding to each of the plurality of banks; and a retention diode controller controlling the array voltage supply circuits to share a retention voltage in a retention operation mode.

According to some implementations, a method of operating an integrated circuit includes setting a retention time for entering a retention operation mode from a normal operation mode according to a memory size using an RC delay; and setting a recovery time for entering the normal operation mode from the retention operation mode according to the memory size. In the retention operation mode, a retention voltages of array voltage supply circuits are shared.

BRIEF DESCRIPTION OF THE DRAWINGS

Features of the present disclosure will be more clearly understood from the following detailed description, taken in conjunction with the accompanying drawings, in which.

DETAILED DESCRIPTION

Hereinafter, implementations will be described with reference to the accompanying drawings.

An embedded memory device according to some implementations of the present invention, an integrated circuit having an embedded memory device, and a method of operating thereof may reduce leakage current in diode retention mode by lowering array voltage when performing retention operations on memory of various sizes generated by a memory compiler. Consequently, data of the embedded memory device may be well maintained during a transition from diode retention mode to standby mode.

The embedded memory device may be applied to a memory device utilizing VDDA collapse write assist by equipping it with an array switch (MPAS), and it may reduce diode variations by sharing diode drain voltages between sub-arrays. In the embedded memory device by utilizing metal RC (Resistance-Capacitance) delay that crosses input-output lines rather than inverter delay, an optimized diode retention mode transition time may be provided depending on the size of the memory instance (such as bits per a word or the number of I/Os).

Figure 1:
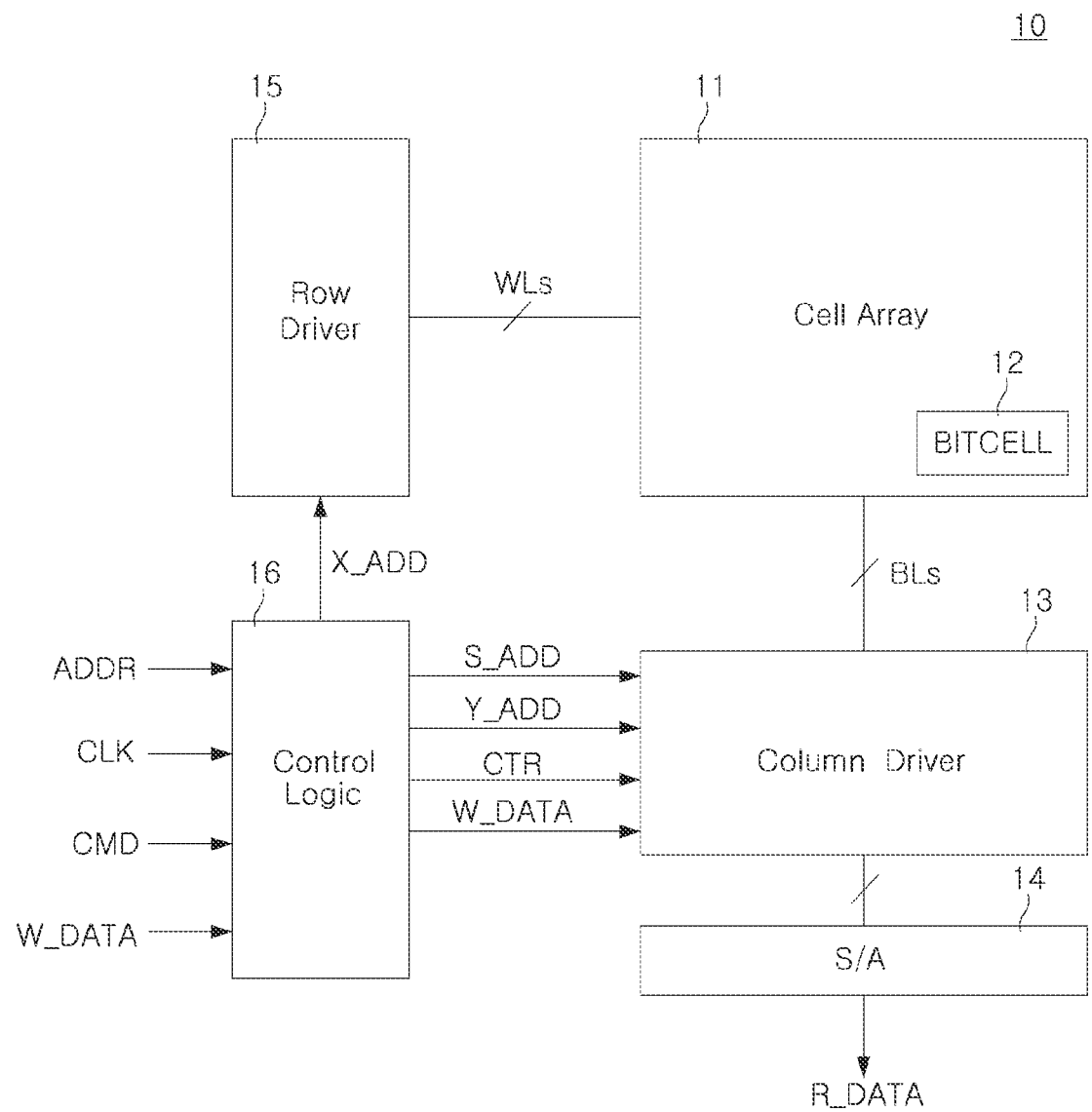
FIG. 1 is a diagram illustrating an example of an embedded memory device 10 according to some implementations.

FIG. 1 is a diagram illustrating an embedded memory device 10 according to some implementations. Referring to FIG. 1, the embedded memory device 10 includes a cell array 11, a column driver 13, a sense amplifier circuit (S/A) 13, a row driver 15, and a control logic 16.

The embedded memory device 10 may receive an address ADDR, a clock CLK, a command CMD, and write data W_DATA. For example, the embedded memory device 10 may receive a command CMD ('write command') instructing a write operation, an address ADDR ('write address') where the write data W_DATA is to be stored, and the write data W_DATA, and the write data W_DATA may be stored in the target area of the cell array 11 corresponding to the write address. In addition, the embedded memory device 10 may receive a command CMD ('read command') instructing read and an address ADDR ('read address') in which read data R_DATA is stored, and the read data R_DATA stored in the target area of the cell array 11 corresponding to the read address may be output externally.

The cell array 11 includes a plurality of bit cells 12. The plurality of bit cells 12 may be arranged at regular intervals in the cell array 11. The plurality of bit cells 12 may be disposed at points at which wordlines WLs and bitlines BLs intersect. In detail, the plurality of bit cells 12 may be respectively connected to at least one of the plurality of wordlines WLs, and may be connected to at least one of the plurality of bitlines BLs.

Each of the plurality of bit cells 12 may be a memory cell. In some implementations, each of the plurality of bit cells 12 is a volatile memory cell. For example, each of the plurality of bit cells 12 may be a static random access memory (SRAM) cell. For example, each of the plurality of bit cells 12 may be a dual port SRAM (DPSRAM) cell capable of simultaneously performing a write operation and a read operation. In some implementations, each of the bit cells 12 may be a non-volatile memory cell, such as a flash memory, a resistive random access memory (RRAM), or the like.

In some implementations, the cell array 11 is divided into a plurality of sub-arrays. In this case, the bit cells 12 may not be disposed at the boundary of the sub arrays. The number of wordlines (WLs)/bitlines (BLs) included in the respective sub arrays may be the same as or different from each other. The embedded memory device 10 may be implemented to perform an access operation on at least one of the sub arrays.

The column driver 13 may be connected to the cell array 11 through a plurality of bitlines BLs. The column driver 13 may be implemented to select at least one bitline from among a plurality of bitlines BLs based on the column address Y_ADD. The column driver 13 may select at least one of a plurality of sub arrays based on the sub array address S_ADD. The sub array address S_ADD may be an address based on the row address X_ADD. For example, the column driver 13 may select a bitline and a complementary bitline included in the sub arrays, based on the column address Y_ADD and the sub array address S_ADD. In this case, the bitline and the complementary bitline may be connected to at least one of the plurality of bit cells 12. As the column driver 13 selects the bitline and the complementary bitline, the plurality of bit cells 12 connected to the bitline and complementary bitline may be selected.

The column driver 13 may perform a read operation or a write operation based on the control signal CTR. The column driver 13 senses current or voltage received through the plurality of bitlines BLs, thereby identifying values stored in the bit cell 12 connected to an activated wordline among the plurality of bit cells 12 and outputting the read data R_DATA based on the identified values.

In addition, the column driver 13 applies current or voltage to the plurality of bitlines BLs based on the write data W_DATA, and may write values to a bit cell connected to an activated wordline among the plurality of bit cells 12. According to some implementations, the column driver 13 includes a read circuit performing a read operation and a write circuit performing a write operation. The column driver 13 may include a bitline precharge circuit precharging the plurality of bitlines BLs.

The sense amplifier circuit (S/A) 14 may be implemented to output read data R_DATA by amplifying a difference between signals output from the column driver 13.

The row driver 15 may be connected to the cell array 11 through a plurality of wordlines WLs. The row driver 15 may be implemented to activate at least one wordline among the plurality of wordlines WLs based on the row address X_ADD. As the row driver 15 selects at least one wordline among the plurality of wordlines WLs based on the row address X_ADD, bit cells 12 connected to the activated wordline among the plurality of bit cells 12 may be selected.

The control logic 16 may receive an address ADDR, a clock CLK, a command CMD, and write data W_DATA, and may be implemented to generate a row address X_ADD, a column address Y_ADD, a sub array address S_ADD, and a control signal CTR. For example, the control logic 16 may identify a read command by decoding command CMD, and generate a row address X_ADD, a column address Y_ADD, a sub array address S_ADD, and a control signal CTR to read the read data R_DATA from the cell array 11. In addition, the control logic 16 may identify a write command by decoding the command CMD, and generate a row address X_ADD, a column address Y_ADD, a sub array address S_ADD, and a control signal CTR to write the write data W_DATA to the cell array 11.

The embedded memory device 10 according to some implementations further includes an array voltage management circuit. The array voltage management circuit may include a power switch MPPS for supplying the array voltage VDDA to the cell array 11, a transistor diode MPD, a diode switch MPDS turned on upon diode retention, and an array switch MPAS connected to an array voltage VDDA separated per column. In some implementations, the array switch MPAS, the transistor diode MPD, and the diode switch MPDS are connected in series. In some implementations, the array switch MPAS-transistor diode MPD-diode switch MPDS connected to the power switch MPPS in series are connected in parallel. In some implementations, the drain of the transistor diode MPD is shared between sub-arrays. In some implementations, gate signal generators of the power switch MPPS, the transistor diode MPD, and the array switch MPAS are implemented using an input/output metal RC delay.

The embedded memory device 10 according to some implementations uses a transistor diode MPD to lower the array voltage VDDA to an external cell power supply voltage (external cell VDD; VDDCE) in the diode retention mode, thereby reducing leakage current of the memory cell. The embedded memory device 10 according to some implementations may be applied to an array to which VDDA collapse write-assist is applied.

In the embedded memory device 10, diode variation may be reduced by sharing a diode drain voltage not only within a sub-array but also between sub-arrays or between banks. In addition, the embedded memory device 10 uses a metal RC delay rather than a delay chain, thereby providing a mode transition time optimized for the size of a memory instance.

Figure 2:
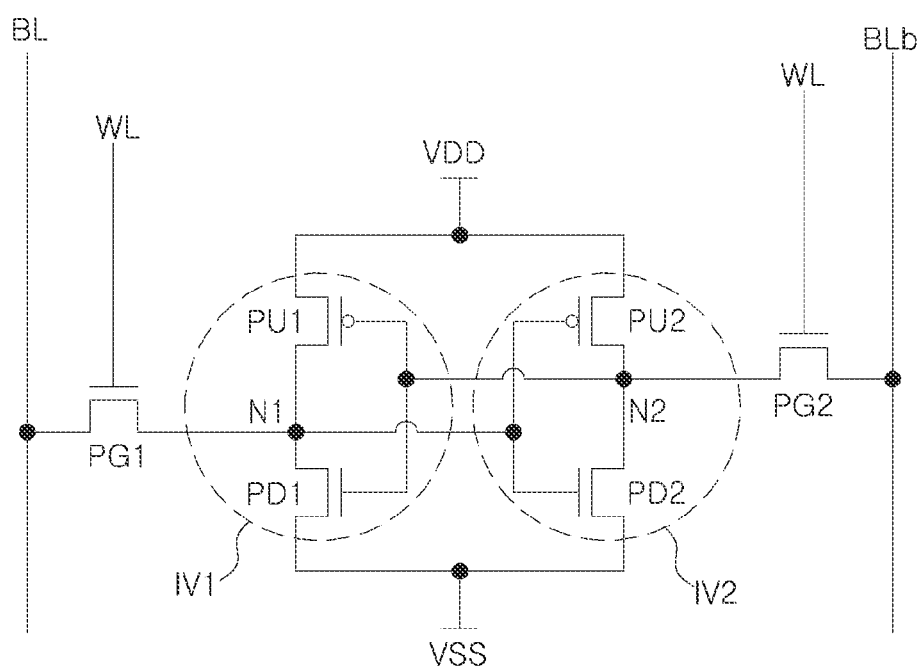
FIG. 2 is a diagram illustrating an example of a bit cell 12 illustrated in FIG. 1 according to some implementations.

FIG. 2 is a diagram illustrating the bit cell 12 illustrated in FIG. 1 according to some implementations. Referring to FIG. 2, the bit cell 12 includes a first pass transistor PG1, a second pass transistor PG2, a first pull-up transistor PU1, and a second pull-up transistor PU2, a first pull-down transistor PD1, and a second pull-down transistor PD2.

In some implementations, the first and second pass transistors PG1 and PG2 and the first and second pull-down transistors PD1 and PD2 are N-type transistors, and the first and second pull-up transistors PU1 and PU2 may be P-type transistors.

In some implementations, the first and second pass transistors PG1 and PG2 and the first and second pull-down transistors PD1 and PD2 are N-Channel Metal Oxide Semiconductor Field Effect Transistors (MOSFETs), and the first and second pull-up transistors PU1 and PU2 may be P-Channel MOSFETs (PFETs).

In some implementations, the first pull-up transistor PU1 and the first pull-down transistor PD1 constitute a first inverter IV1, and the second pull-up transistor PU2 and the second pull-down transistor PD2 constitute a second inverter IV2. In detail, the drain terminal of the first pull-up transistor PU1 may be connected to the drain terminal of the first pull-down transistor PD1, and a gate of the first pull-up transistor PU1 may be electrically connected to a gate of the first pull-down transistor PD1. The power supply voltage VDD may be applied to the source terminal of the first pull-up transistor PU1, and the ground voltage VSS may be applied to the source terminal of the first pull-down transistor PD1. Accordingly, the first pull-up and first pull-down transistors PU1 and PD1 may constitute the first inverter IV1.

Similarly, the drain terminal of the second pull-up transistor PU2 may be connected to the drain terminal of the second pull-down transistor PD2, and a gate of the second pull-up transistor PU2 may be electrically connected to a gate of the second pull-down transistor PD2. The power supply voltage VDD may be applied to the source terminal of the second pull-up transistor PU2, and a ground voltage VSS may be applied to a source terminal of the second pull-down transistor PD2. Accordingly, the second pull-up and second pull-down transistors PU2 and PD2 may constitute the second inverter IV2. The gate of the first pull-up transistor PU1 and the gate of the first pull-down transistor PD1 connected to each other may correspond to an input terminal of the first inverter IV1, and a first node N1 connected to the drain terminal of the first pull-up transistor PU1 and the drain terminal of the first pull-down transistor PD1 may correspond to an output terminal of the first inverter IV1. The gate of the second pull-up transistor PU2 and the gate of the second pull-down transistor PD2 connected to each other may correspond to an input terminal of the second inverter IV2, and the second node N2 connected to the drain terminal of the second pull-up transistor PU2 and the drain terminal of the second pull-down transistor PD2 may correspond to the output terminal of the second inverter IV2.

In some implementations, the first inverter IV1 and the second inverter IV2 are connected in a latch structure. In detail, the gate of the first pull-up transistor PU1 and the gate of the first pull-down transistor PD1 may be connected to the second node N2, and a gate of the second pull-up transistor PU2 and a gate of the second pull-down transistor PD2 may be connected to the first node N1. One end of the first pass transistor PG1 may be connected to the first node N1 and the other end of the first pass transistor PG1 may be connected to the bitline BL. One end of the second pass transistor PG2 may be connected to the second node N2 and the other end of the second pass transistor PG2 may be connected to the complementary bitline BLb. The gate of the first pass transistor PG1 and the gate of the second pass transistor PG2 may be connected to the wordline WL.

The bit cell 12 may write logic data through the first node N1 and the second node N2, using the wordline WL, the bitline BL, and the complementary bitline BLb, or may read logic data through the first node N1 and the second node N2.

Figure 3:
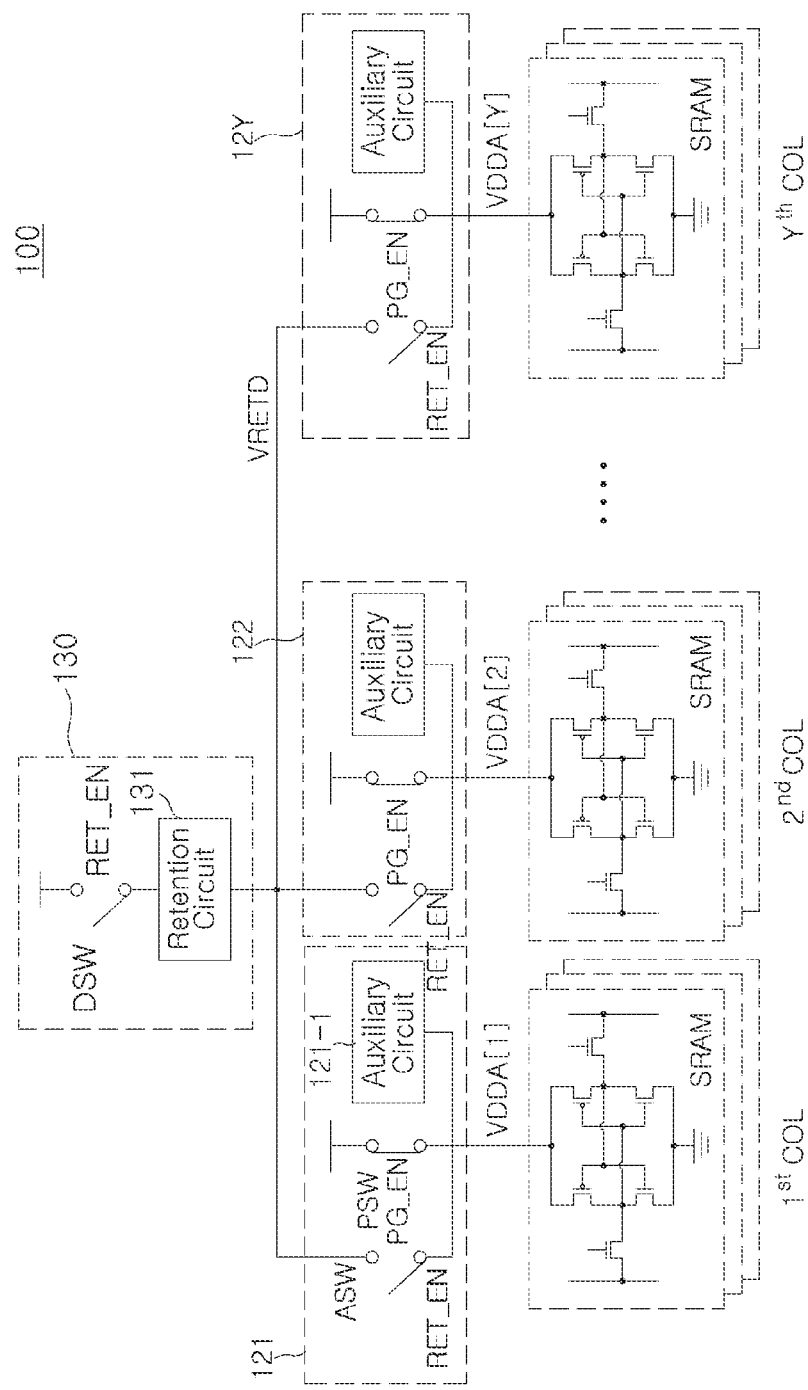
FIG. 3 is a diagram illustrating an example of an array voltage management circuit 100 according to some implementations.

FIG. 3 is a diagram illustrating an array voltage management circuit 100 according to some implementations.

Referring to FIG. 3, the array voltage management circuit 100 includes array voltage supply circuits 121 to 12Y providing array voltages VDDA[1] to VDDA[Y], and a retention voltage supply circuit 130.

The first array voltage supply circuit 121 may include an array voltage switch ASW, a power switch PSW, and an auxiliary circuit 121-1.

The array voltage switch ASW is connected to the shared retention voltage supply circuit 130, and may be implemented to provide the first array voltage VDDA[1] corresponding to the retention voltage VREAD in the retention mode operation.

The power switch PSW may be implemented to provide the first array voltage VDDA[1] corresponding to the power supply voltage VDD in the normal operation mode.

The auxiliary circuit 121-1 may be implemented to provide the corresponding first array voltage VDDA[1] in a write operation or a read operation.

The array voltage supply circuits 121 to 12Y may be implemented identical or similar to each other.

The retention voltage supply circuit 130 may include a diode switch DSW and a retention circuit 131. The diode switch DSW may be implemented to provide the power supply voltage VDD to the retention circuit 131 in the retention operation mode. The retention circuit 131 may include at least one diode. In this case, the diode may be implemented as a transistor diode.

The embedded memory device 10 may provide a retention operation of reducing the array voltage VDDA to a minimum voltage VMIN that may maintain data to significantly reduce leakage while maintaining memory data, and a power-down operation to turn off the power supplied to the array voltage VDDA without retaining data. In some implementations, the embedded memory device 10 selectively operates a retention operation and a power-down operation as required.

When entering the retention operation, the power switch PSW is turned off after the retention switches DSW and ASW are turned on, to preserve data appropriately, and thus, the array voltage VDDA may be always greater than the minimum voltage VMIN. Also, when entering the normal mode from the retention operation mode, since the power switch PSW is first turned on and then the retention switches DSW and ASW are turned off, the drop of the array voltage VDDA may be prevented.

An auxiliary circuit 121-1 for controlling the array voltage VDDA may be used to help write and read operations of the memory. Since a memory device having a column MUX structure should control only the array voltage VDDA of a selected column, the array voltage VDDA is separated for each column.

Since general memory devices include a separate retention circuit for each column, retention/recovery time varies greatly. Meanwhile, the embedded memory device 10 according to some implementations uses the retention circuit 130 shared by the columns, and therefore, the effect of time fluctuation may be significantly reduced. The embedded memory device 10 according to some implementations may provide a shared retention circuit 130 to reduce variation in retention/recovery time even in the case in which the array voltage VDDA is separated for each column.

Figure 4:
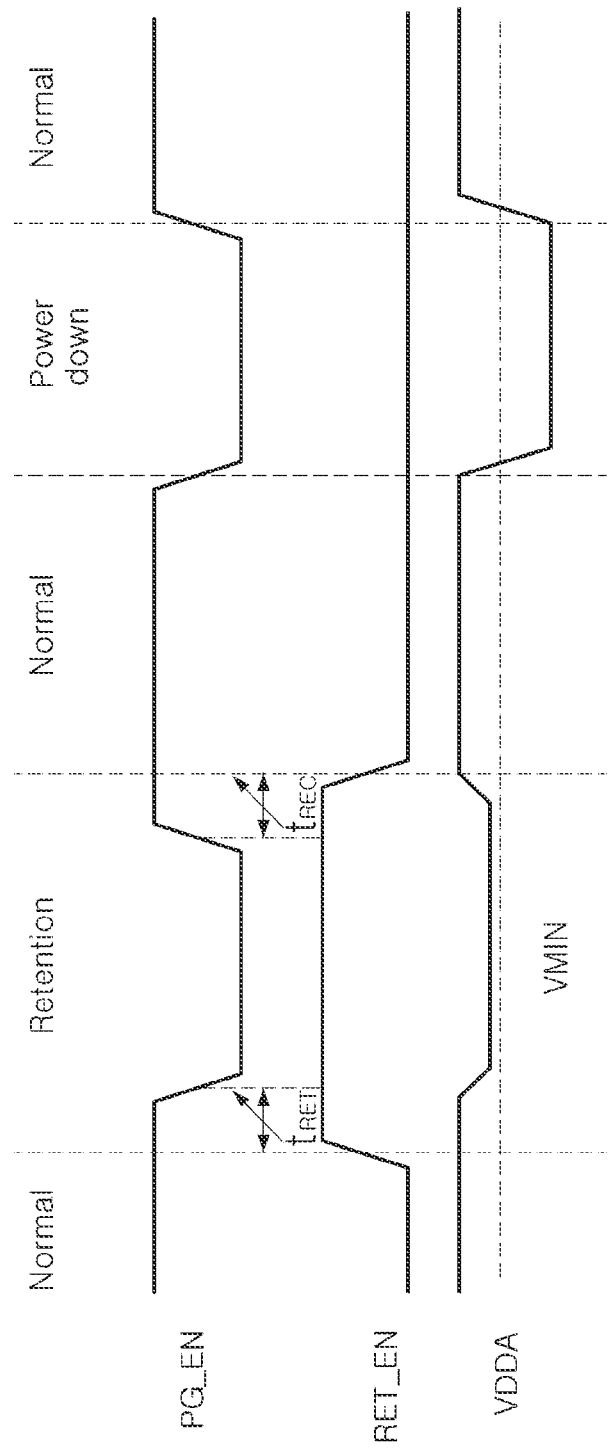
FIG. 4 is a diagram illustrating example operation timing of the memory device illustrated in FIG. 3 according to some implementations.

FIG. 4 is a diagram illustrating operation timing of the memory device illustrated in FIG. 3 according to some implementations. As illustrated in FIG. 4, the array voltage VDDA may be adjusted by controlling the power gate activation signal PG_EN and the retention activation signal RET_EN.

For example, in the retention operation mode, the power gate activation signal PG_EN has a low level, and the retention activation signal RET_EN has a high level. At this time, the array voltage VDDA may maintain the minimum voltage VMIN. As illustrated in FIG. 4, the retention time $t_{RET}$ is the time to enter the retention operation.

Also, in the normal operation mode, the power gate activation signal PG_EN has a high level and the retention activation signal RET_EN has a low level. At this time, the array voltage VDDA may maintain the power supply voltage VDD. As illustrated in FIG. 4, the recovery time $t_{REC}$ is the time to return to the normal operation.

Also, in the power-down mode, the power gate activation signal PG_EN has a low level and the retention activation signal RET_EN has a low level. At this time, the array voltage VDDA may maintain the ground voltage GND.

The memory device 10 according to some implementations provides a retention time $t_{RET}$ to enter a retention operation that varies according to various sizes thereof generated by an SRAM compiler and a recovery time $t_{REC}$ to recover to a normal operation, and may thus have optimal time ($t_{RET}$, $t_{REC}$) while operating stably.

One or more features of the implementations described above are applicable to implementations of a memory device comprised of a plurality of cell arrays.

Figure 5:
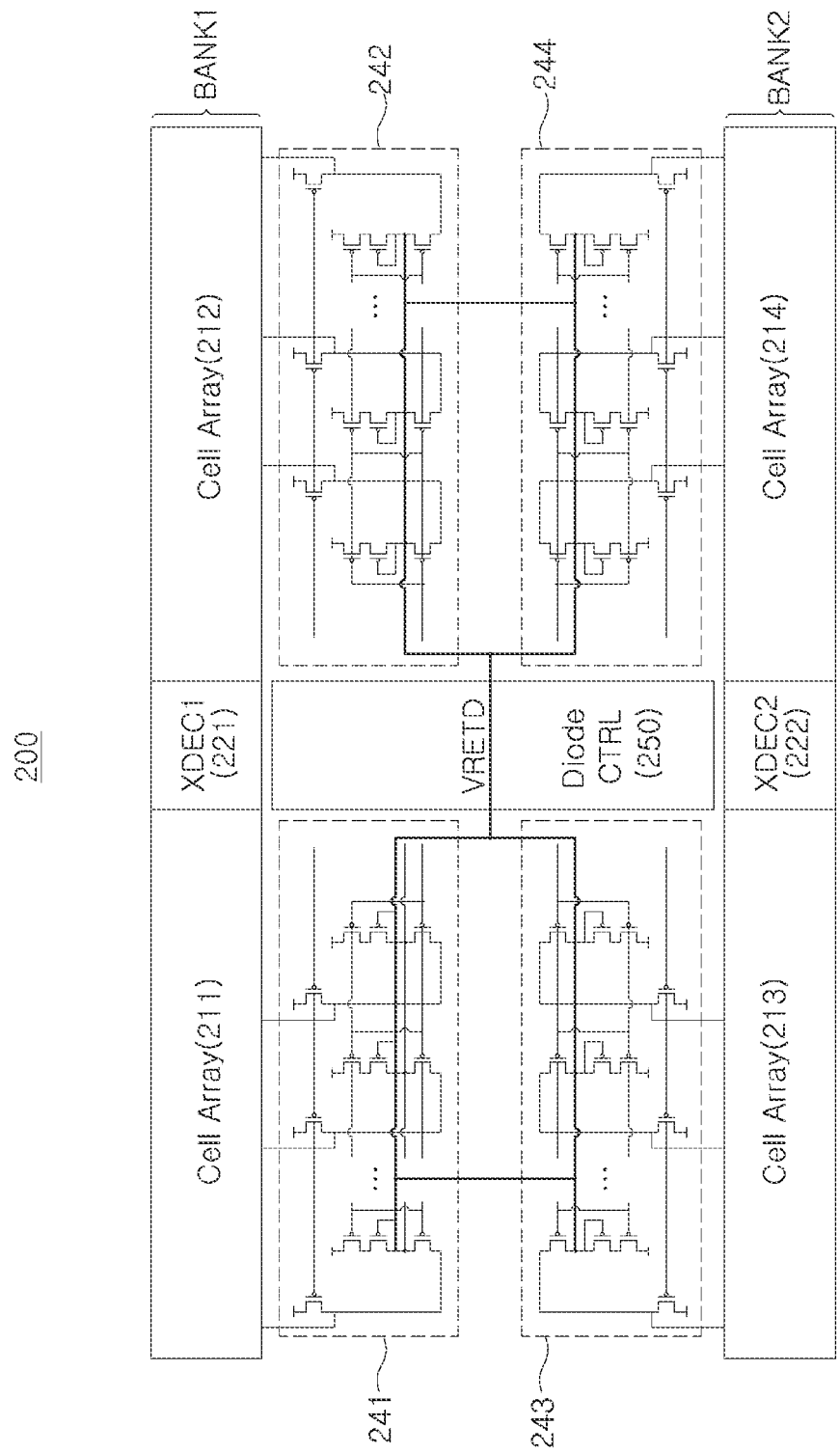
FIG. 5 is a diagram illustrating an example of an embedded memory device 200 according to some implementations.

FIG. 5 is a diagram illustrating an embedded memory device 200 according to some implementations. Referring to FIG. 5, the embedded memory device 200 includes a plurality of cell arrays 211, 212, 213 and 214, row decoders 221 and 222, array voltage supply circuits 241, 242, 243 and 244, and a retention diode controller 250.

Each of the array voltage supply circuits 241, 242, 243, and 244 has a structure in which an array switch MPAS is added between the array voltage VDDA and the drain of the transistor diode MPD. Each of the array voltage supply circuits 241, 242, 243, and 244 turns off the array switch MPAS when performing a VDDA collapse operation, and may thus be prevented from being affected by the diode MPD. On the other hand, in each of the array voltage supply circuits 241, 242, 243, and 244, the source VRETD of the array switch MPAS rather than the array voltage VDDA may be shared by all columns.

As illustrated in FIG. 5, when using the central decoders XDEC1 and XDEC2, the source VRETD may be shared between the left and right IOs. In addition, when using 2 banks, the source VRETD may be shared between banks. Accordingly, diode variation may be significantly reduced by sharing a relatively larger number of diodes MPD.

Additionally, by disposing the diode switch MPDS and the transistor diode MPD only in one area between the two banks without inserting the same for each bank, layout optimization may be relatively easy.

In the embedded memory device 200 according to some implementations, even when each column has a separate array voltage VDDA, it may be implemented such that an array switch MPAS is inserted between the array voltage VDDA and the drain node of the diode to have a shared retention circuit (e.g., diode), and the diode retention voltage VRETD may be shared within the SRAM array. In some implementations, by sharing the diode retention voltage VRETD between both sides of the retention diode controller 250 and shared between banks in an SRAM array, diode variation may be significantly reduced.

Figure 6:
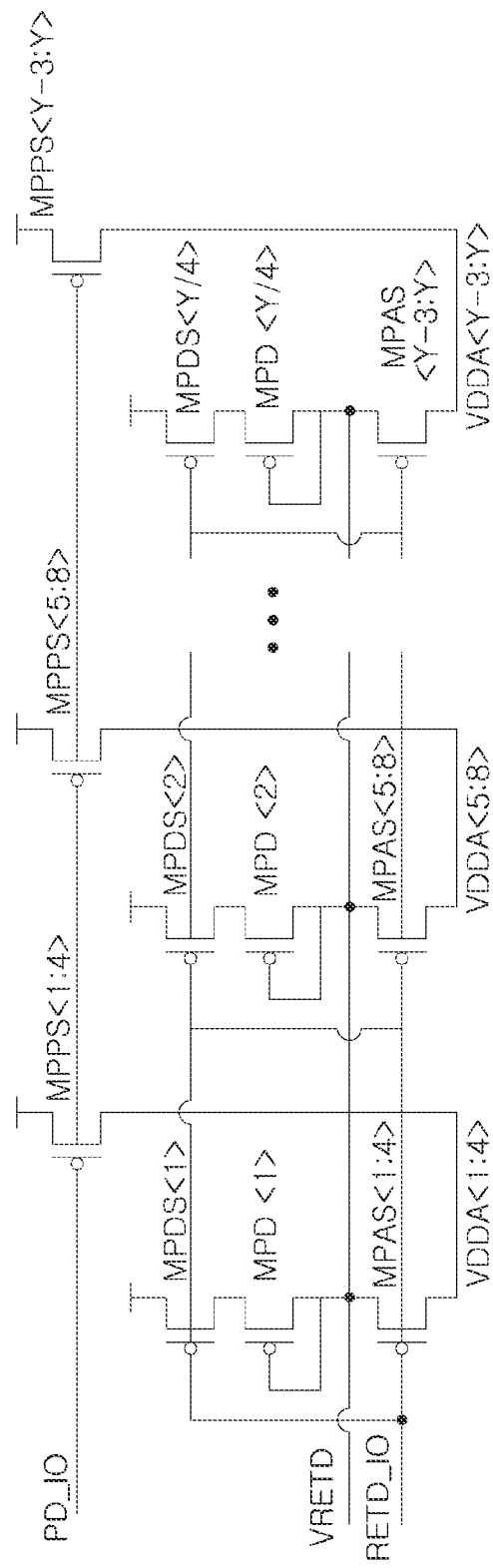
FIG. 6 is a diagram illustrating an example of the array voltage supply circuit 241 illustrated in FIG. 5 according to some implementations.

FIG. 6 is a diagram illustrating the array voltage supply circuit 241 illustrated in FIG. 5 according to some implementations. Referring to FIG. 6, the array voltage supply circuit 241 includes power switch transistors MPPS<1:4>, MPPS<5:8>, ..., MPPS<Y-3:Y>, diode switch transistors MPDS<1>, MPDS<2>, ..., MPDS<Y/4>, diode transistors MPD<1>, MPD<2>, MPD<Y/4>, and array switch transistors MPAS<1:4>, MPAS<5:8>, ..., MPAS<Y-3:Y>.

When using VDDA collapse write assist to improve the writability of the embedded memory device 200, the array voltage VDDA may be separated for each column to collapse only the array voltage VDDA of a selected column.

Figure 7:
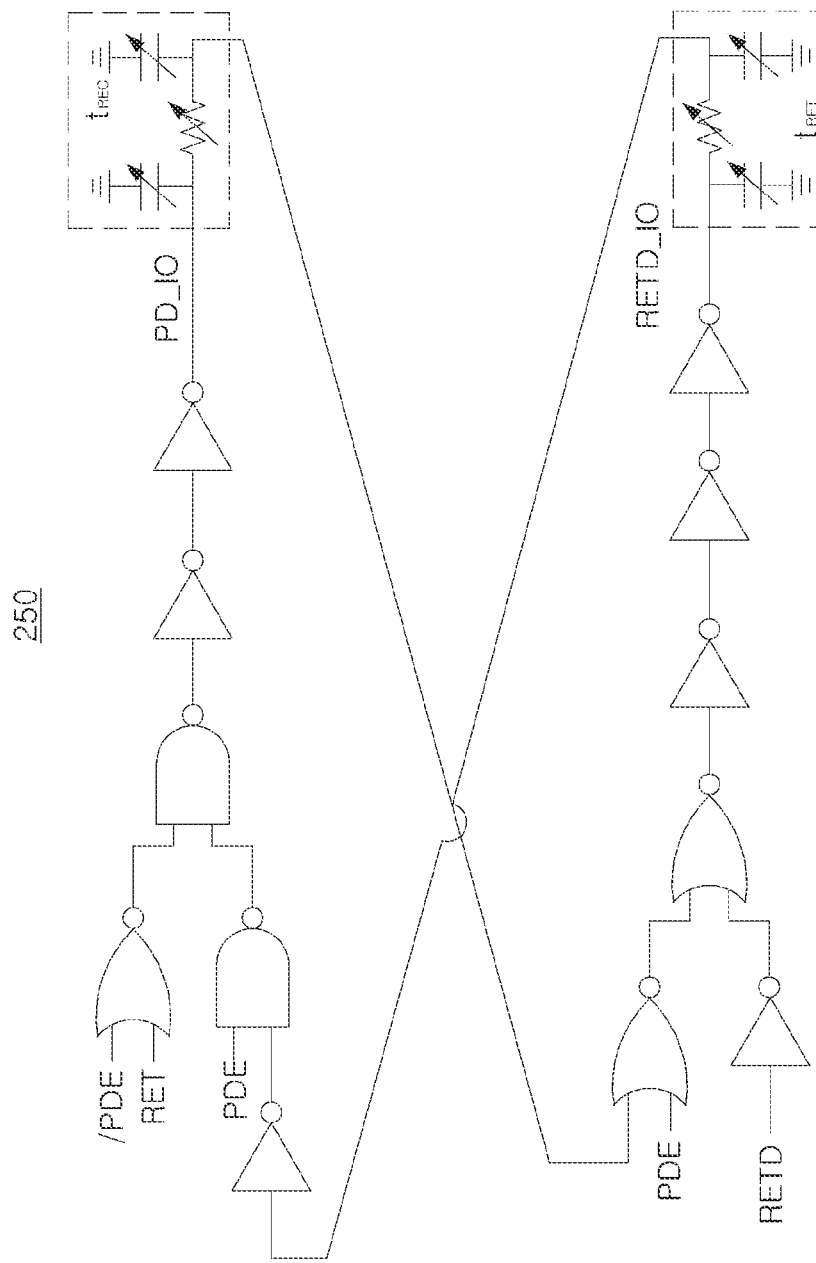
FIG. 7 is a diagram illustrating an example of the retention diode controller 250 illustrated in FIG. 5 according to some implementations.

FIG. 7 is a diagram illustrating the retention diode controller 250 illustrated in FIG. 5 according to some implementations. Referring to FIG. 7, the retention diode controller 250 receives the retention signal RET and the power activation signal PDE, and may be implemented to output a combination signal of the retention signal RET and the power activation signal PDE as a power down signal PD_IO and a retention diode activation signal RETD_IO by using an RC delay. It should be understood that the logic circuits of the retention diode controller 250 illustrated in FIG. 7 are merely examples.

A general retention diode controller uses an inverter chain to generate a fixed delay used in non-overlap signal generators. Meanwhile, the retention diode controller 250 according to some implementations may be implemented using an RC delay of metal routing that becomes longer as the number of columns of an SRAM instance increases. Accordingly, the retention diode controller 250 may generate two switch signals PD_IO and RETD_IO having $t_{RET}$ and $t_{REC}$ that become greater as the number of SRAM columns increases.

Figure 8:
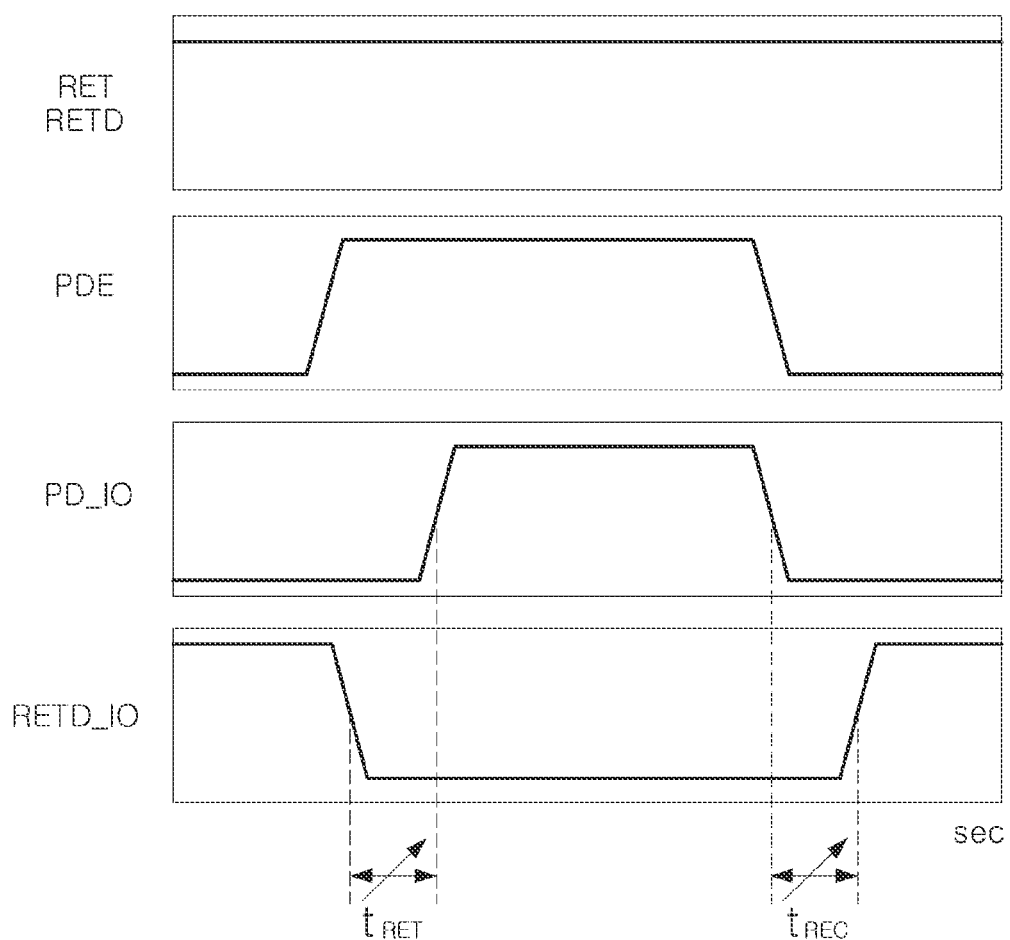
FIG. 8 is a diagram illustrating an example operation of generating switch signals PD_IO and RETD_IO of the retention diode controller 250 according to some implementations.

FIG. 8 is a diagram illustrating an operation of generating switch signals PD_IO and RETD_IO of the retention diode controller 250 according to some implementations.

In the embedded memory device 200, when transitioning from normal operation to retention operation, the diode switch MPDS farthest from the retention diode controller 250 is turned on, and by generating a power-down signal PD_IO to turn off the diode switch MPDS using the subsequent retention diode activation signal RETD_IO, a stable retention voltage VRET entry may be secured.

In addition, when the embedded memory device 200 transitions from the retention operation to the normal operation, by turning on the power switch MPS located farthest away and using the signal PD_IO returned, recovery may be performed stably by generating a signal RETD_IO to turn off the diode switch MPDS.

In an embedded memory device according to some implementations, $t_{RET}$ and $t_{REC}$ are variable according to the number of IOs instead of a constant delay. In detail, the embedded memory device 200 according to some implementations may track and generate metal routing that becomes longer due to the number of IOs. When designing the SRAM compiler, compared to the method of designing $t_{RET}$ and $t_{REC}$ to be constant based on a maximum size, the embedded memory device according to some implementations may provide smaller $t_{RET}$ and $t_{REC}$ as fewer IOs are used.

Figure 9:
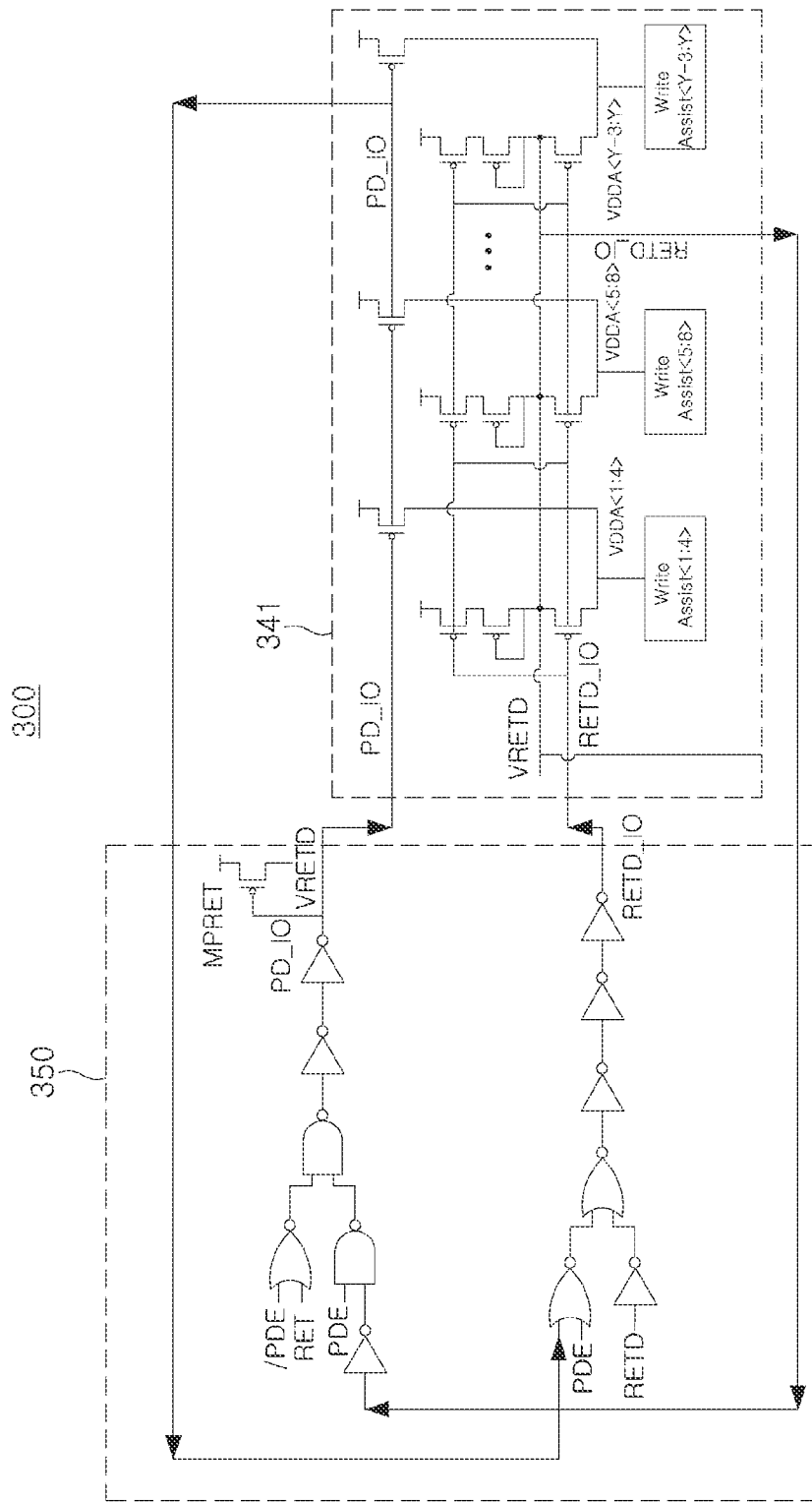
FIG. 9 is a diagram illustrating an example of a voltage control circuit 300 according to some implementations.

FIG. 9 is a diagram illustrating a voltage control circuit 300 according to some implementations. Referring to FIG. 9, the voltage control circuit 300 includes an array voltage supply circuit 341 and a retention diode controller 350.

The array voltage supply circuit 341 is implemented similarly to the array voltage supply circuit 241 of FIG. 6 and may further include a write assist circuit. The retention diode controller 350 is implemented similarly to retention diode controller 250 of FIG. 7, and may further include a transistor providing the retention voltage VRETD in response to the switch signal MPREF.

Figure 10:
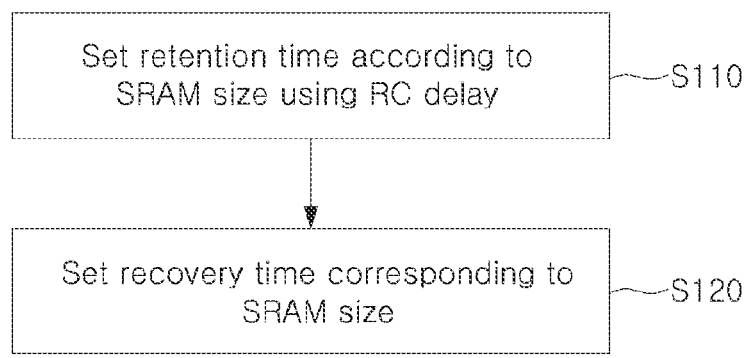
FIG. 10 is a flowchart illustrating an example method of operating an integrated circuit according to some implementations.

FIG. 10 is a flowchart illustrating a method of operating an integrated circuit according to some implementations. Referring to FIGS. 1 to 10, the method of operating an integrated circuit is as follows. The retention time is set according to the size of the SRAM using the RC delay (S110). In this case, the SRAM size may be determined by the SRAM compiler. The retention time may be determined using a shared diode. Thereafter, a recovery time corresponding to the size of the SRAM is set (S120).

In some implementations, a memory size is set in a memory compiler. In some implementations, the power gate activation signal is maintained at a high level in the normal operation mode, and the retention activation signal may be maintained at a low level. In some implementations, in the retention operation mode, the power gate activation signal is maintained at a low level and the retention activation signal may be maintained at a high level. In some implementations, in the power-down mode, the power gate activation signal is maintained at a low level and the retention activation signal may be maintained at a low level.

Figure 11:
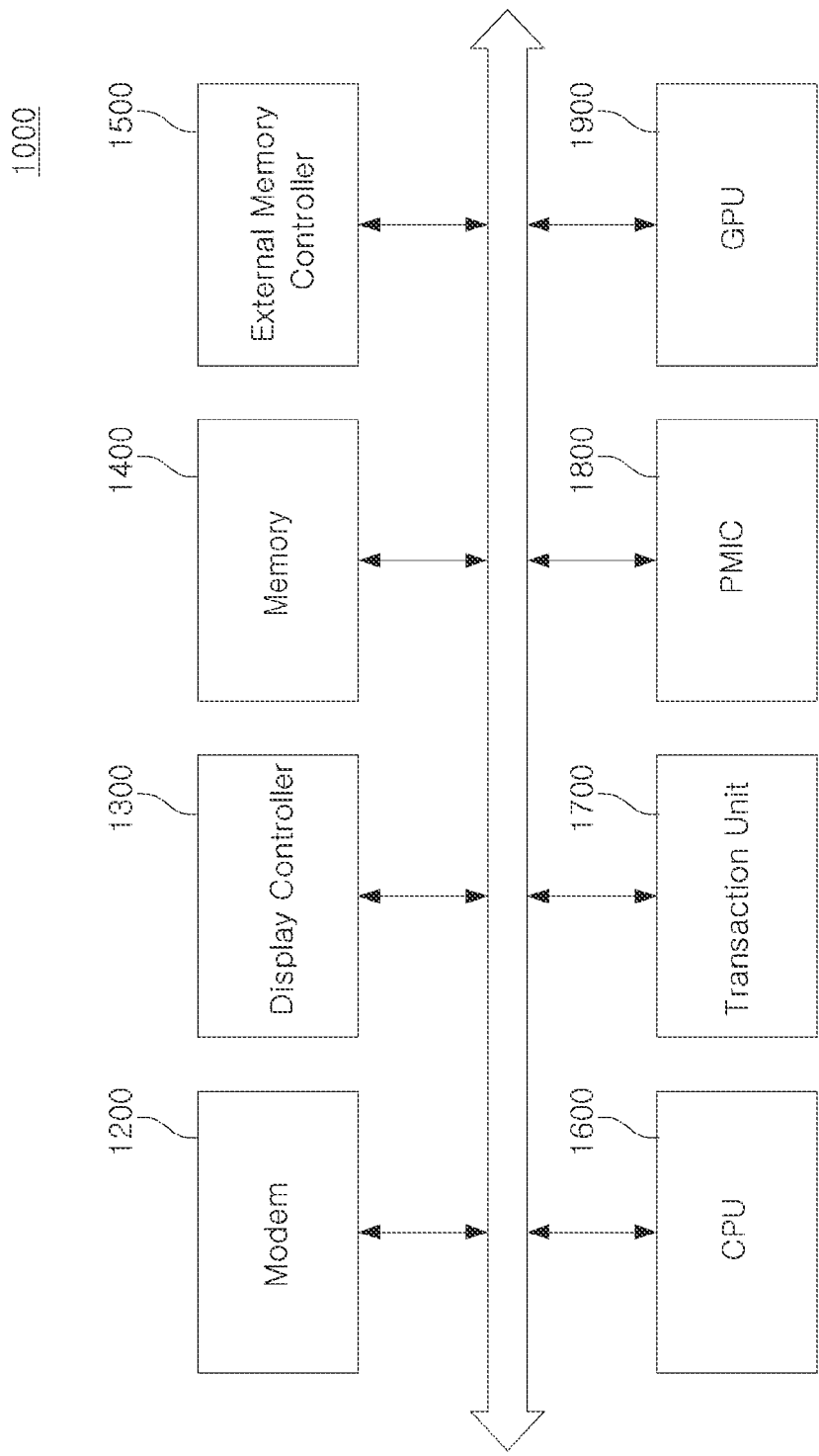
FIG. 11 is a diagram illustrating an example of a system on chip (SOC) according to some implementations.

FIG. 11 is a diagram illustrating a system on chip (SOC) according to some implementations. An SOC 1000 is an implementation of complex functional blocks such as intellectual property (IP) performing various functions on a single chip, and bit cells disposed according to some implementations may be included in respective functional blocks of the SOC 1000.

Referring to FIG. 11, the SOC 1000 includes a modem 1200, a display controller 1300, a memory device 1400, an external memory controller 1500, a central processing unit (CPU) 1600, a transaction unit 1700, a PMIC 1800, and a graphics processing unit (GPU) 1900. Respective functional blocks of the SOC 1000 may communicate with each other through a system bus 1100. The CPU 1600, which may control the overall operation of the SOC 1000, may control the operations of the other functional blocks 1200, 1300, 1400, 1500, 1700, 1800, and 1900.

The modem 1200 may demodulate a signal received from the outside of the SOC 1000 or modulate a signal generated inside the SOC 1000 and transmit the signal externally. The display controller 1300 may transmit data generated inside the SOC 1000 to a display by controlling the display (or a display device) outside the SOC 1000.

The memory device 1400 may include a non-volatile memory such as an Electrically Erasable Programmable Read-Only Memory (EEPROM), a flash memory, a Phase Change Random Access Memory (PRAM), a Resistance Random Access Memory (RRAM), a Nano Floating Gate Memory (NFGM), a Polymer Random Access Memory (PoRAM), a Magnetic Random Access Memory (MRAM), a Ferroelectric Random Access Memory (FRAM), and the like. The memory device 1400 may also include a volatile memory such as a Dynamic Random Access Memory (DRAM), a Static Random Access Memory (SRAM), a Mobile DRAM, a Double Data Rate Synchronous Dynamic Random Access Memory (DDR SDRAM), a Low Power DDR (LPDDR) SDRAM, a Graphics DDR (GDDR) SDRAM, a Rambus Dynamic Random Access Memory (RDRAM), and the like. As described with reference to FIGS. 1 to 10, the memory device 1400 may be implemented as an embedded memory device sharing a retention circuit.

The external memory controller 1500 may control an operation of transmitting and receiving data from an external integrated circuit connected to the SOC 1000. For example, programs or data stored in an external integrated circuit may be provided to the CPU 1600 or the GPU 1900 under the control of the external memory controller 1500.

The transaction unit 1700 may monitor data transactions of respective functional blocks, and the PMIC 1800 may control power supplied to respective functional blocks according to the control of the transaction unit 1700.

The GPU 1900 may execute program instructions related to graphics processing. The GPU 1900 may receive graphics data through the external memory controller 1500, and may also transmit graphics data processed by the GPU 1900 to the outside of the SOC 1000 through the external memory controller 1500.

The device described above may be implemented as a hardware component, a software component, or a combination of hardware components and software components. For example, the devices and components described in the example embodiments may be implemented using one or more general-purpose computers or special-purpose computers, along with a processor, a controller, an arithmetic logic unit (ALU), a digital signal processor, a microcomputer, a field programmable gate array (FPGA), a programmable logic unit (PLU), a microprocessor, or any other devices that may execute instructions and respond. The processing device may run an operating system (OS) and one or more software applications running on the operating system. The processing device may also access, store, manipulate, process, and generate data in response to execution of software. For convenience of understanding, one processing device is sometimes described as being used, but those skilled in the art will appreciate that a processing device may include a plurality of processing elements or a plurality of types of processing elements. For example, a processing device may include a plurality of processors or one processor and one controller. Also, other processing configurations are possible, such as parallel processors.

Software may include a computer program, code, instructions, or a combination of one or more thereof, and may configure the processing devices to operate as desired or command the processing devices independently or collectively. Software or data may be embodied in any tangible machine, component, physical device, virtual equipment, computer storage medium or device, to be interpreted by, or to provide instructions or data to, a processing device. Software may be distributed on networked computer systems and stored or executed in a distributed manner. Software and data may be stored on one or more computer readable media.

In general, a memory structure specifies the definition of circuit elements and data that define the rules for combining these circuit elements to create a memory instance. The specific requirements for a memory instance are entered into the memory compiler as input parameters through a graphical user interface (GUI). For example, the input parameters may specify various aspects of required memory instances defining selection of various optional features such as power gating features, the size of the memory array, and multiplexing placement of the memory array, a built-in-self-test (BIST) mode to be supplied, and the like. Also, the memory compiler creates the required memory instances based on the memory structure and input parameters. The memory compiler according to some implementations includes required components for a shared retention circuit. A general-purpose computer that may be used to perform the above-described memory compilation operation may be used to create such a memory instance.

Implementations of the present disclosure may be used for diode and diode control of an SRAM Compiler. In some implementations, an SRAM compiler diode retention mode is provided, and retention and recovery time may be optimized. In some implementations, even in SRAM using a VDDA collapse write assist circuit, diode retention mode is provided using diodes of a relatively small size through diode sharing between sub-arrays. According to some implementations, optimal retention and recovery time may be provided in SRAM of various sizes generated by the compiler. In the embedded memory device according to some implementations, a switch may be inserted between the diode and the VDDA. The embedded memory device according to some implementations may share the source voltage VRETD of the diode with both sides of the control. In the embedded memory device according to some implementations, a diode is inserted into only one area of IO between cell arrays in a 2-bank structure and share the diode source voltage VRETD between banks. The embedded memory device according to some implementations includes a diode controller and a switch set providing both power down and retention modes. The embedded memory device according to some implementations may include a diode controller using RC delay by metal routing that becomes longer according to the number of columns (IOs) during transitioning from retention mode to normal mode. The embedded memory device according to some implementations may include a diode controller using RC delay by metal routing that becomes longer according to the number of columns (IO) when transitioning from normal mode to retention mode.

As set forth above, in an embedded memory device according to some implementations, an integrated circuit having the embedded memory device, and a method of operating the embedded memory device, leakage of a memory cell are reduced using a PMOS diode in a retention operation mode.

In an embedded memory device according to some implementations, an integrated circuit having the embedded memory device, and a method of operating the embedded memory device, retention fluctuation may be reduced by sharing a diode drain voltage between sub-arrays or between banks.

An embedded memory device according to some implementations, an integrated circuit having the embedded memory device, and a method of operating the embedded memory device may provide a mode transition time optimized for a size of a memory instance using a metal RC delay.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a combination can in some cases be excised from the combination, and the combination may be directed to a subcombination or variation of a subcombination.

While example implementations have been illustrated and described above, it will be apparent to those skilled in the art that modifications and variations could be made without departing from the scope according to some implementations as defined by the appended claims.

What is claimed is:

1. An embedded memory device comprising:
   a retention voltage supply circuit configured to output a retention voltage in response to a retention activation signal; and
   a plurality of array voltage supply circuits configured to output a plurality of array voltages respectively to a plurality of bit cells,
   wherein each array voltage supply circuit of the plurality of array voltage supply circuits includes:
      an array switch configured to provide the retention voltage as a corresponding array voltage in response to the retention activation signal,
      a power switch configured to provide a power supply voltage as the corresponding array voltage in response to a power gate activation signal, and
      a diode-connected transistor,
   wherein drain nodes of the diode-connected transistors of the plurality of array voltage supply circuits are electrically connected to one another.

2. The embedded memory device of claim 1, wherein the retention voltage supply circuit includes:
   a retention switch configured to form a connection to a power terminal in response to the retention activation signal; and
   a retention circuit connected between the retention switch and the plurality of array voltage supply circuits.

3. The embedded memory device of claim 2, wherein the retention switch includes a PMOS transistor.

4. The embedded memory device of claim 2, wherein the retention circuit includes a second diode-connected transistor.

5. The embedded memory device of claim 2, wherein, in each array voltage supply circuit of the plurality of array voltage supply circuits, the array switch, the power switch, or both the array switch and the power switch include a PMOS transistor.

6. The embedded memory device of claim 1, wherein, in a retention operation mode:

the array switch of each array voltage supply circuit of the plurality of array voltage supply circuits is configured to receive the retention activation signal at a high level, and the power switch of each array voltage supply circuit of the plurality of array voltage supply circuits is configured to receive the power gate activation signal at a low level.

7. The embedded memory device of claim 1, wherein, in a normal operation mode;
the array switch of each array voltage supply circuit of the plurality of array voltage supply circuits is configured to receive the retention activation signal at a low level, and the power switch of each array voltage supply circuit of the plurality of array voltage supply circuits is configured to receive the power gate activation signal at a high level.

8. The embedded memory device of claim 1, wherein, in a power-down mode:
the array switch of each array voltage supply circuit of the plurality of array voltage supply circuits is configured to receive the retention activation signal at a low level, and the power switch of each array voltage supply circuit of the plurality of array voltage supply circuits is configured to receive the power gate activation signal at a low level.

9. The embedded memory device of claim 1, further comprising a retention diode controller configured to generate the retention activation signal and the power gate activation signal,
wherein the retention voltage is shared between two sides of the retention diode controller or shared between a plurality of banks.

10. The embedded memory device of claim 1, wherein the retention voltage supply circuit is disposed in one area between a first memory bank of the embedded memory device and a second memory bank of the embedded memory device.

11. An embedded memory device comprising:
a first cell array, a second cell array, a third cell array, and a fourth cell array;
a first row decoder disposed in the first cell array and the second cell array;
a second row decoder disposed in the third cell array and the fourth cell array;
a first array voltage supply circuit configured to provide a first array voltage to the first cell array;
a second array voltage supply circuit configured to provide a second array voltage to the second cell array;
a third array voltage supply circuit configured to provide a third array voltage to the third cell array;
a fourth array voltage supply circuit configured to provide a fourth array voltage to the fourth cell array; and
a retention diode controller configured to control the first to fourth array voltage supply circuits to share a retention voltage in a retention operation mode.

12. The embedded memory device of claim 11, wherein the first to fourth array voltage supply circuits are configured to each provide a separate array voltage for at least one column.

13. The embedded memory device of claim 11, wherein the first to fourth array voltage supply circuits each include:
at least one power switch transistor configured to form a first connection to a power terminal in response to a power down signal;
at least one diode switch transistor configured to form a second connection to the power terminal in response to a retention signal;
at least one diode transistor connected to a drain of the at least one diode switch transistor and having a drain configured to output the retention voltage; and
at least one array switch transistor configured to form a connection to the drain of the at least one diode transistor in response to the retention signal.

14. The embedded memory device of claim 13, wherein at least one of the at least one power switch transistor, the at least one diode switch transistor, the at least one diode transistor, and the at least one array switch transistor includes a PMOS transistor.

15. The embedded memory device of claim 13, wherein the retention diode controller is configured to generate the power down signal and the retention signal using a Resistance-Capacitance (RC) delay of metal routing, wherein the RC delay varies based on a number of columns of a memory instance.

16. An integrated circuit comprising:
at least one processor; and
a memory device configured to store data for an operation of the at least one processor,
wherein the memory device includes:
a plurality of banks having a plurality of bit cells connected between a plurality of wordlines and a plurality of bitlines,
a plurality of array voltage supply circuits configured to respectively provide a plurality of array voltages corresponding to the plurality of banks, and
a retention diode controller configured to control the plurality of array voltage supply circuits to share a retention voltage in a retention operation mode, wherein the retention diode controller is configured to is configured to output a retention signal having a resistance-capacitance (RC) delay variable that is based on an instance size of a memory.

17. The integrated circuit of claim 16, wherein each array voltage supply circuit of the plurality of array voltage supply circuits includes:
at least one power switch transistor configured to form a first connection to a power terminal in response to a power down signal;
at least one diode switch transistor configured to form a second connection to the power terminal in response to the retention signal;
at least one diode transistor connected to a drain of the at least one diode switch transistor and having a drain configured to output the retention voltage; and
at least one array switch transistor configured to form a connection to the drain of the at least one diode transistor in response to the retention signal.

18. The integrated circuit of claim 17, wherein each array voltage supply circuit of the plurality of array voltage supply circuits includes a write assist circuit configured to compensate the array voltage of the array voltage supply circuit during a write operation.

19. The integrated circuit of claim 17, wherein the retention diode controller is configured to output the retention signal and the power down signal by combining one or more of a retention activation signal, a retention diode activation signal, or a power-down activation signal.

* * * * *